United States Patent
Kelley et al.

(10) Patent No.: US 9,569,873 B2
(45) Date of Patent: *Feb. 14, 2017

(54) AUTOMATED ITERATIVE IMAGE-MASKING BASED ON IMPORTED DEPTH INFORMATION

(71) Applicant: International Business Machines Corporation, Armonk, NY (US)

(72) Inventors: John F. Kelley, Clarkesville, GA (US); Todd Seager, Orem, UT (US)

(73) Assignee: International Business Machines Coproration, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/588,476

(22) Filed: Jan. 2, 2015

(65) Prior Publication Data

US 2015/0154779 A1    Jun. 4, 2015

Related U.S. Application Data

(63) Continuation of application No. 13/732,562, filed on Jan. 2, 2013, now Pat. No. 8,983,176.

(51) Int. Cl.
| | |
|---|---|
| G06T 7/00 | (2006.01) |
| G06T 11/60 | (2006.01) |
| H04N 13/02 | (2006.01) |

(52) U.S. Cl.
CPC ............. *G06T 11/60* (2013.01); *G06T 7/0051* (2013.01); *G06T 7/0065* (2013.01);
(Continued)

(58) Field of Classification Search
CPC ................. G06T 7/0051; G06T 7/0065; G06T 2207/20221; H04N 13/0271
See application file for complete search history.

(56) References Cited

U.S. PATENT DOCUMENTS

| | | | |
|---|---|---|---|
| 4,522,475 A | 6/1985 | Ganson | |
| 5,307,170 A | 4/1994 | Itsumi et al. | |
| (Continued) | | | |

FOREIGN PATENT DOCUMENTS

| | | |
|---|---|---|
| EP | 0751674 A2 | 1/1997 |
| JP | 10-206150 | 8/1998 |
| (Continued) | | |

OTHER PUBLICATIONS

Hyperfocal Distance Guide, Printed: Oct. 24, 2012, Copyright: 2002 Don Fleming; <http://www.dofmaster.com/hyperfocal.html>, 5 pages.

(Continued)

*Primary Examiner* — Utpal Shah
(74) *Attorney, Agent, or Firm* — Schmeiser, Olsen & Watts, LLP; John Pivnichny

(57) ABSTRACT

A method, process, and associated systems for automatically selecting and masking areas of a still image or frame of a video clip as a function of depth-information metadata embedded into the image or frame. An image-editing or video-editing workstation receives an image or frame into which has been embedded a set of depth values. Each depth value identifies a distance from the camera position of an object depicted by a pixel of the image or frame. When a user directs the workstation to automatically select or mask a region of the image or frame, the workstation uses the depth values, optionally in conjunction with other graphical properties of each pixel, to automatically select which pixels to include in the selection or mask such that the selection or mask identifies an approximate area of the image or frame that represents a three-dimensional object.

20 Claims, 2 Drawing Sheets

(52) U.S. Cl.
CPC ....... *G06T 7/0081* (2013.01); *H04N 13/0271* (2013.01); *G06T 2207/10028* (2013.01)

(56) References Cited

U.S. PATENT DOCUMENTS

| | | | |
|---|---|---|---|
| 6,320,979 | B1 | 11/2001 | Melen |
| 6,624,402 | B2 | 9/2003 | Kaneko et al. |
| 6,801,717 | B1 * | 10/2004 | Hofer ................ H04N 5/23212 348/E5.045 |
| 7,006,709 | B2 * | 2/2006 | Kang ........................ G06K 9/32 345/422 |
| 7,551,770 | B2 * | 6/2009 | Harman ................ G06T 7/0022 345/419 |
| 7,706,632 | B2 | 4/2010 | Gouch |
| 7,711,259 | B2 | 5/2010 | Daley |
| 7,747,067 | B2 * | 6/2010 | Popescu ................. G01B 11/25 382/154 |
| 8,254,630 | B2 | 8/2012 | Abe |
| 8,406,548 | B2 * | 3/2013 | Ali .......................... G06T 5/002 382/254 |
| 8,432,434 | B2 | 4/2013 | Veeraraghavan et al. |
| 8,638,329 | B2 * | 1/2014 | Izumi ................... H04N 13/026 345/419 |
| 8,983,176 | B2 | 3/2015 | Kelley et al. |
| 2002/0041339 | A1 | 4/2002 | Diepold |
| 2006/0072851 | A1 * | 4/2006 | Kang ........................ G06K 9/32 382/294 |
| 2006/0072852 | A1 * | 4/2006 | Kang ........................ G06K 9/32 382/294 |
| 2007/0053675 | A1 | 3/2007 | Pollard |
| 2007/0269119 | A1 | 11/2007 | Hyerle et al. |
| 2008/0031327 | A1 | 2/2008 | Wang et al. |
| 2008/0175576 | A1 | 7/2008 | Hong et al. |
| 2008/0309770 | A1 | 12/2008 | Florea et al. |
| 2010/0157127 | A1 * | 6/2010 | Takayanagi ........ H04N 5/23293 348/333.02 |
| 2010/0182495 | A1 | 7/2010 | Murata |
| 2011/0069884 | A1 | 3/2011 | Zhang et al. |
| 2011/0150321 | A1 * | 6/2011 | Cheong ................... G06T 11/60 382/154 |
| 2011/0280475 | A1 | 11/2011 | Singhal et al. |
| 2011/0293137 | A1 | 12/2011 | Gurman et al. |
| 2012/0007940 | A1 | 1/2012 | Michrowski et al. |
| 2012/0007942 | A1 * | 1/2012 | Michrowski ........... H04N 7/147 348/14.08 |
| 2012/0069222 | A1 * | 3/2012 | Steinberg ............... G06K 9/036 348/239 |
| 2012/0098947 | A1 | 4/2012 | Wilkes |
| 2012/0106937 | A1 | 5/2012 | Molin et al. |
| 2012/0133639 | A1 * | 5/2012 | Kopf ..................... G06T 3/4038 345/419 |
| 2012/0169849 | A1 | 7/2012 | Ferren |
| 2012/0200726 | A1 | 8/2012 | Bugnariu |
| 2012/0242790 | A1 * | 9/2012 | Sandrew ............ H04N 13/0267 348/43 |
| 2013/0033582 | A1 | 2/2013 | Sun et al. |
| 2013/0094753 | A1 | 4/2013 | Voss et al. |
| 2013/0113988 | A1 | 5/2013 | Wajs |
| 2013/0127823 | A1 | 5/2013 | Diverdi et al. |
| 2014/0185920 | A1 | 7/2014 | Kelley et al. |

FOREIGN PATENT DOCUMENTS

| | | |
|---|---|---|
| JP | 2007-128009 | 5/2007 |
| JP | 2010041299 A | 2/2010 |
| WO | 2009013682 A2 | 1/2009 |

OTHER PUBLICATIONS pCAM Film+Digital Calculator, Printed Oct. 24, 2012, <http://www.davideubank.com/Good_Focus/pCAM_Film+Digital_Calculator.html>, 4 pages.

Bargh, Peter, Focus Stacking—a macro photography technique, You Tube Video, retrieved on Dec. 10, 2013 from website: <http//:www.youtube.com/watch?v=fJiEw4VCcYU>, 3 pages.

Ron Bigelow, Sharpening in Photoshop—Part II, retrieved Apr. 3, 2014 from website: <http://www.ronbigelow.com/articles/sharpen2/sharpen2.htm>, 11 pages.

Ron Bigelow, Sharpening in Photoshop—Part V, retrieved Dec. 13, 2013 from website: <http://www.ronbigelow.com/articles/sharpen5/sharpen5.htm>, 23 pages.

Billiot et al., 3D Image Acquisition System Based on Shape From Focus Technique, Sensors 2013, ISSN 1424-8220, retrieved from website: <www.mdpi.com/journal/sensors>, pp. 5041-5053 and cover sheet.

Cambridge in Colour, Focus Stacking & Depth of Field, retrieved on Dec. 10, 2013 from website: <http://www.cambridgeincolour.com/tutorials/focus-stacking.htm>, 13 pages.

Cambridge in Colour, Guide to Image Sharpening, retrieved on Apr. 3, 2014 from website: <http://www.cambridgeincolour.com/tutorials/image-sharpening.htm>, 9 pages.

Cambridge in Colour, Tutorials: Sharpness, retrieved on Dec. 13, 2013 from website: <http://www.cambridgeincolour/tutorials/sharpness.htm>, 6 pages.

James E Cutting, Representing motion in a static image: constraints and parallels in art, science, and popular culture, Perception, 2002, vol. 31, pp. 1165-1193.

EarthBound Light, Close-up: Focusing Rails, retrieved on Mar. 31, 2014 from website: <http//www.earthboundlight.com/phototips/closeup-focusing-rail.html>, 2 pages.

Raoul Isidro Creative Arts, NIKON D5000 The Fun Guide, retrieved on Sep. 5, 2013 from website: <http://raoulisidro.com/page10.htm>, 13 pages.

Masuch et al., Speedlines, Depicting Motion in Motionless Pictures, In: SIGGRAPH'99 Conference Abstracts and Applications, S. 277, ACM SIGGRAPH, 1999, 3 pages.

Vitaly Druchinin, Anti Aliasing/Low Pass filter removal for sharper more detailed images . . . , Life Pixel, Digital Infrared Conversion, Nov. 1, 2012, retrieved on Dec. 13, 2013 from website: <http://www.lifepixel.com/blog/anti-aliasing-low-pass-filter-removal>, 5 pages.

Spirit of Photography Home, Focus Stacking Techniques for Extended Depth of Field, retrieved on Sep. 5, 2013 from website: <http://community.spiritofphotography.com/index.php?page=22>, 14 pages.

Spitzer, What is a Redshift, You tube video, retrieved on Mar. 17, 2014 from website: <http://www.youtube.com/watch?v=FhfnqboacV0>, 3 pages.

Wesley, The NIKON D8001E Autofocus Saga Continues, Nikon Fanboy, Aug. 22, 2012, retrieved on Sep. 5, 2013 from website: <http://nikonfanboy.com/tag/asymmetric-focus>, 9 pages.

Wikipedia, Focus Stacking, Wikipedia, the free encyclopedia, last modified Nov. 9, 2013, retrieved on Mar. 31, 2014 from website: <http://en.wikipedia.org/wiki/Focis_stacking>, 3 pages.

Wikipedia, Wikipedia, the free encyclopedia, Redshift, retrieved on Mar. 17, 2014 from website: <http://en.wikipedia.org/w/index.php?title=Redshift&printable=yes>, 11 pages.

Meunier et al., Radar image modeling: A 3D spectral domain approach, 0/8194-2211-8/96, SPIE vol. 2823, pp. 149-159, retrieved on Jan. 11, 2013 from website: http://proceedings.spiedigitallibrary.org/>.

U.S. Appl. No. 13/732,577, filed Jan. 2, 2013.
U.S. Appl. No. 14/231,281, filed Mar. 31, 2014.
U.S. Appl. No. 14/231,097, filed Mar. 31, 2014.
U.S. Appl. No. 14/248,396, filed Apr. 9, 2014.
Notice of Allowance (Mail date Oct. 27, 2014) for U.S. Appl. No. 13/732,562, filed Jan. 2, 2013.
Amendment (Sep. 30, 2014) for U.S. Appl. No. 13/732,562, filed Jan. 2, 2013.
Office Action (Mail date Sep. 19, 2014) for U.S. Appl. No. 13/732,562, filed Jan. 2, 2013.

* cited by examiner

AUTOMATED ITERATIVE IMAGE-MASKING BASED ON IMPORTED DEPTH INFORMATION

This application is a continuation application claiming priority to Ser. No. 13/732,562, filed Jan. 2, 2013, now U.S. Pat. No. 8,983,176, issued Mar. 17, 2015.

CROSS-REFERENCE TO RELATED APPLICATION

The present application is related to U.S. application Ser. No. 13/732,577, entitled "DEPTH OF FIELD VISUALIZATION," filed on Jan. 2, 2013 naming Todd Seager and John F. Kelley as inventors.

The present invention relates to using imported depth information to automate selection and masking functions of an image-editing or video-editing application.

BACKGROUND

The ability to precisely mask or select an irregularly shaped area of an image or video frame is an essential requirement of image-editing and video-editing applications.

BRIEF SUMMARY

A first embodiment of the present invention provides a method of using imported depth information to mask or select areas of a first digital image, the method comprising:

a processor of a computer system receiving a first set of depth values associated with the first digital image, wherein the first digital image comprises a first set of pixels, and wherein a first depth value of the first set of depth values is associated with a first pixel of the first set of pixels;

the processor accepting a command to select a first subset of the first set of pixels;

the processor, in response to the command, selecting the first pixel as a function of the first depth value.

A second embodiment of the present invention provides a computer program product, comprising a computer-readable hardware storage device having a computer-readable program code stored therein, said program code configured to be executed by a processor of a computer system to implement a method of using imported depth information to mask or select areas of a first digital image, the method comprising:

the processor receiving a first set of depth values associated with the first digital image, wherein the first digital image comprises a first set of pixels, and wherein a first depth value of the first set of depth values is associated with a first pixel of the first set of pixels;

the processor accepting a command to select a first subset of the first set of pixels;

the processor, in response to the command, selecting the first pixel as a function of the first depth value.

A third embodiment of the present invention provides computer system comprising a processor, a memory coupled to said processor, and a computer-readable hardware storage device coupled to said processor, said storage device containing program code configured to be run by said processor via the memory to implement a method of image selection and masking using imported depth information, method comprising:

the processor receiving a first set of depth values associated with the first digital image, wherein the first digital image comprises a first set of pixels, and wherein a first depth value of the first set of depth values is associated with a first pixel of the first set of pixels;

the processor accepting a command to select a first subset of the first set of pixels;

the processor, in response to the command, selecting the first pixel as a function of the first depth value.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with said computer system is configured to implement a method of image selection and masking using imported depth information, the method comprising:

a processor of a computer system receiving a first set of depth values associated with the first digital image, wherein the first digital image comprises a first set of pixels, and wherein a first depth value of the first set of depth values is associated with a first pixel of the first set of pixels;

the processor accepting a command to select a first subset of the first set of pixels;

the processor, in response to the command, selecting the first pixel as a function of the first depth value.

DETAILED DESCRIPTION

Figure 1:
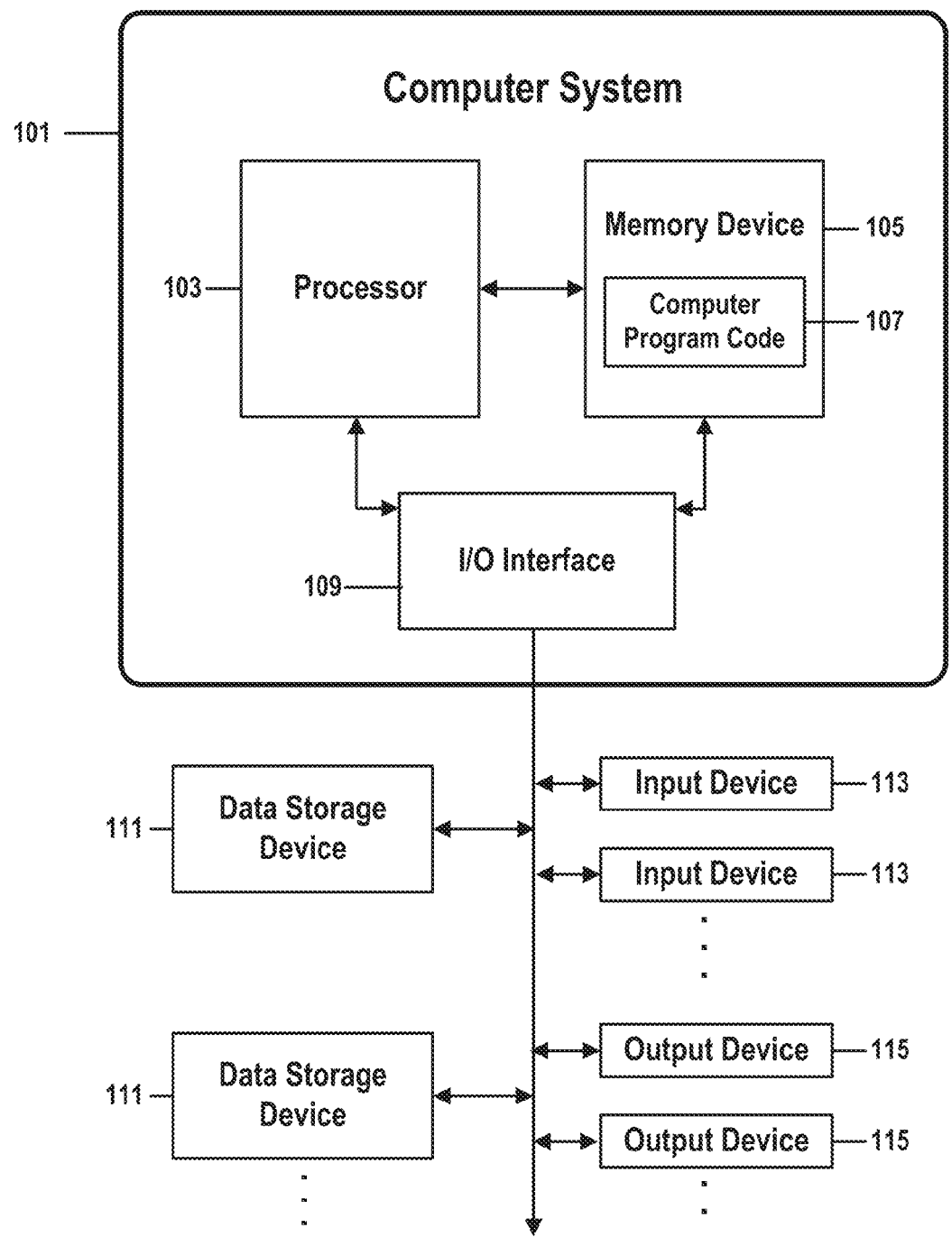
FIG. 1 shows a structure of a computer system and computer program code that may be used to implement a image selection and masking using imported depth information in accordance with embodiments of the present invention.

The present invention provides a method, a computer system, a computer program product, and a service for using imported depth information to select or mask areas of edited images and video frames.

In this document, the verbs "mask" and "select" are used interchangeably to describe a step of delineating an area of a displayed image, and the nouns "mask" and "selection" are used interchangeably to describe such a delineated area. The functional differences between an image-editor's or a video-editor's masking features and selection features, as may be known to those skilled in the art, are not relevant to the method of the present invention.

References to a digital "image" herein should be construed to include references to a frame of a digital video clip and references to an "image-editing" application should be construed to include references to a digital video-editing application. References to a "digital camera" should similarly be construed to include references to both digital still cameras and digital videocameras.

Using an image-editing or video-editing software application to mask or select an area of an image or video frame can be time-consuming, but masking and selection are important and common editing functions that often must be performed with painstaking precision. Masking or selecting an area of an image is necessary in order to identify that area as a target for many types of editing functions or to distinguish an area of an image within a particular editing layer or alpha channel.

An image-editing application may comprise a manual masking or selection tool that lets users choose a subset of the pixels comprised by a two-dimensional digital image. Such a manual tool may require a user to choose a subset by hand-drawing a boundary around an area on the screen.

An image-editing application may further comprise an automatic masking or selection tool that automatically draws a boundary around an area based on characteristics of the pixels located within and in the vicinity of that area. Examples of such automatic selection tools include, but are not limited to, tools configured to choose pixels within a contiguous or noncontiguous area that are associated with brightness, luminosity, or hue values that fall within a specified absolute or relative range of values. In some cases, a user may designate a reference value, against which the associated values of other pixels are compared when pixels are chosen, by manually clicking a reference pixel or reference set of pixels on the screen.

The present invention helps an image-editing application to more accurately choose which pixels to include in such a selection by embedding into the image a set of depth values. These depth values may be similar to "focus point" depth data generated by a multipoint focusing feature of a digital camera and, in some embodiments, may be imported from such a camera along with a digital image. Depth values may also be identified by a variety of other mechanisms. A digital still camera, digital videocamera, or an other type of digital-imaging device might, for example, identify a depth distance of a subject by using technologies like radar, sonar, detection of sensors placed on the subject, 3D digital modeling, or motion detection.

Each depth value may identify a distance behind the surface plane of the two-dimensional image (the "camera position") along an axis perpendicular to that plane. Such a depth distance may be associated with a subset of the pixels comprised by the image and may represent the location along this perpendicular "depth" axis of an object represented by the associated subset of pixels. In other words, a "depth value" describes how far a three-dimensional object represented by an area of a two-dimensional image is located from the camera position.

These depth values may be organized into a data structure called a "depth map," which an editing application may construct and embed as metadata into the image being edited. Such a depth map may comprise depth information that allows the image-editing program to choose whether a pixel should be included within a selection, wherein that choice is made as a function of the subject-to-image-plane distance of an object represented all or in part by that pixel. The exact format of a depth-map data structure is implementation-dependent and may comprise any data structure that may allow storage and access of a depth value comprised by the depth map.

In some embodiments, such an embedded depth-map may allow an image-editing application to merely estimate an initial selection boundary, requiring manual adjustment to more precisely delineate a desired selection. In other embodiments, an image-editing application may comprise additional isolation features that help users fine-tune a selection boundary, or may combine depth values with other secondary values to more intelligently or more accurately choose pixels.

These secondary values may comprise, but are not limited to: the value associated with a pixel's luminance, hue, saturation, or gloss; the value of the opacity, luminosity or other characteristic of an alpha channel at the pixel's position; and the value of the opacity, luminosity or other characteristic of a previously defined mask at the pixel's position. In some embodiments, an application may try to detect patterns of depth values or patterns of other types of values in order to more intelligently or accurately associate areas of the image with the three-dimensional objects they represent.

FIG. 1 shows a structure of a computer system and computer program code that may be used to implement a image selection and masking using imported depth information in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium (s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-2 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Figure 2:
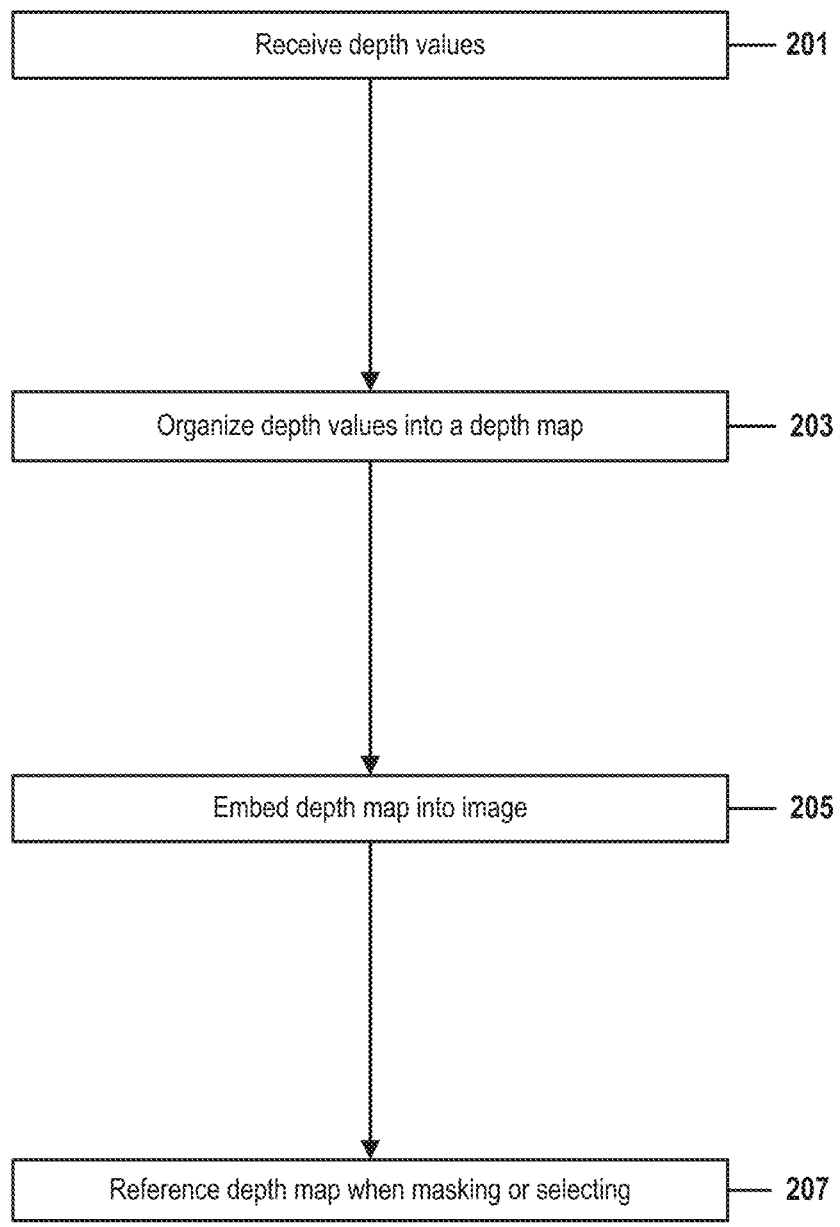
FIG. 2 is a flow chart that overviews a method for image selection and masking using imported depth information in accordance with embodiments of the present invention presented herein.

The flowchart illustrations and/or block diagrams FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for image selection and masking using imported depth information in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for image selection and masking using imported depth information.

Any of the components of the present invention could be created, integrated, hosted, maintained, deployed, managed, serviced, supported, etc. by a service provider who offers to facilitate a method for image selection and masking using imported depth information. Thus the present invention discloses a process for deploying or integrating computing infrastructure, comprising integrating computer-readable code into the computer system 101, wherein the code in combination with the computer system 101 is capable of performing a method for image selection and masking using imported depth information.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107.

Generally, a computer program product (or, alternatively, an article of manufacture) of computer system 101 may comprise said computer-readable hardware storage device.

FIG. 2 is a flow chart that overviews a method for image selection and masking using imported depth information in accordance with embodiments of the present invention presented herein. FIG. 2 comprises steps 201-207.

In step 201, an image-editing software application receives a set of depth values that are associated with a digital image, wherein the image comprises a set of pixels, and wherein the application is being used to edit the image or will be used to edit the image.

Each depth value is associated with a subset of the set of pixels comprised by the image. A depth value may be a function of a distance behind the two-dimensional surface plane of the image of an object represented all or in part in the image by the associated subset of pixels. If, for example, a photographic image depicts a golf ball that was twenty feet away from the camera when the image was photographed, a depth value of twenty feet may be associated with all or part of the area of the image that represents the golf ball. In some embodiments, this depth value may be relative to or may be an other function of the twenty-foot value.

In embodiments, an image may be associated with one depth value or with a plurality of depth values, and a depth value may be associated with a normull contiguous or noncontiguous subset of the set of pixels comprised by the image. A depth value may also be associated with a two-dimensional or three-dimensional object represented by a normull or noncontiguous subset of the set of pixels comprised by the image.

A depth value associated with an image, the number of depth values associated with an image, and the choice of pixels associated with each depth value may be determined by an operation of an apparatus or of a software program that created the image, by an image-editing application that may be used to edit the image, or by an intervening technology or procedure that identifies a depth value, a number of depth values, or a choice of associated pixels as a function of a characteristic of the image.

The method of the present invention does not comprise a mechanism by which a depth value is identified, by which a number of depth values associated with an image is selected, or by which a subset of pixels is chosen to be associated with a depth value. Mechanisms that perform some of these functions may comprise, but are not limited to, methods based on spectral analysis and multipoint-focus technologies, or other technologies, as described below. These mechanisms may be integrated into a digital still camera, into a digital videocamera, or into some other digital-imaging apparatus or software, and may be performed before, after, or at a time contemporaneous with the time an image is created. In some cases, such mechanisms may perform mathematical computations upon one or more multipoint "focus points" or similar entities that identify areas of the image in order to calculate depth values for subsets of the set of pixels comprised by the image, wherein each subset of pixels is associated with one such focus point, similar entity, or depth value.

The mechanism by which a depth value may be received by embodiments of the present invention is not comprised by embodiments of the present invention.

Step 203 may, in some embodiments, organize the depth values associated with the image into a data structure known as a "depth map." This depth map may represent the "depth distances" of subsets of pixels in the image or of objects represented by subsets of pixels in the image along a "depth axis" that is orthogonal to the two-dimensional plane of the image. Such a depth distance may represent an absolute or relative distance from the camera position of a three-dimensional object represented in the image. In some embodiments, this step is performed by the image-editing application. In other embodiments, this step may be performed by other hardware or software entities that process the image between the time the image is created until the time that the image is edited by the image-editing application. In yet other embodiments, this step is skipped and the depth values received in step 201 are not organized into a data structure.

Step 205 embeds the depth map created in step 203 into the photographic image. This embedding may augment the two-dimensional image with information about the three-dimensional spatial relationships among objects represented by the image. In some embodiments, this step is performed by the image-editing application. In other embodiments, this step may be performed by other hardware or software entities that process the image from the time it is created until the time when it is edited by the image-editing application.

In embodiments wherein step 203 is not performed, the discrete received depth values, rather than a depth map data structure, may be embedded into the image.

In Step 207, the image-editing application, upon being directed to mask or select an area of the image, refers to the depth map in order to choose which pixels to include in the mask or selection. This choosing may be a function of the subsets of the depth map's depth values that are associated with subsets of the pixels in the image and may supersede or complement other means of choosing pixels as sole functions of other parameters, such as luminance, hue, or color.

If, for example, an image comprises a representation of ten bowling pins arranged in a standard triangular configuration in a bowling lane, the pixels that represent each pin may have similar color, hue, and luminance values. An image-editing application thus could not use color, hue, or luminance values to automatically mask or select an area of the image that represents only the closest "head" pin because the values of those parameters would not distinguish pixels that represent that one pin from pixels that represent the more distant pins.

Embodiments of the present invention might, however, be able to automatically mask the area that represents only the head pin if that area of the image is associated with a depth value distinguishable from the depth values of areas of the image that represent the other, more distant, pins. Here, the depth values provide additional information upon which pixel choice may be based.

The number of depth values associated with an image may be an indicator of the relative accuracy with which automated masking or selection functions in compliance with embodiments of the present invention may be performed. Associating an image with only a few depth values may provide rough approximations of the depth distance of objects represented by large areas of an image. But associating every pixel of an image with a corresponding depth value would allow pixel-accurate automatic masking and selection based on the depth distance of objects represented by the image. Practical embodiments may associate an image with a number of depth values that falls between these two extremes.

In some embodiments, automatic pixel choice may be performed as a function of an absolute depth distance. In our earlier bowling-pin illustration, if all pins in the second row are located one meter behind the surface plane of the image, a user might select this second row of pins by directing an image-editing application to select all pixels that have a depth distance of one meter. In some embodiments, a user might be able to set a tolerance value or a range of depth distances that might, for example, allow her to direct the editing application to select pixels or areas of the image that are associated with a depth distance within a range of 0.75-1.25 meters or to select pixels or areas of the image associated with a depth distance of 1.0 meters with a 10% tolerance.

In other embodiments, automatic pixel choice may be determined by an other function of the depth values comprised by the image's depth map. In our bowling-pin example, the image-editor might respond to a user selecting a pixel associated with the representation of the headpin by automatically creating a mask around that pixel, wherein each pixel in the mask is associated with a depth value that is a function of the selected pixel's depth value. Such a function might comprise, but is not limited to, masking pixels that have depth values that are within a certain percent of the user-selected pixel, that are within a range of absolute distances greater than or less than that of the user-selected pixel, or that satisfy a set of conditions that depend upon a plurality of parameters, wherein the plurality of parameters may comprise, but are not limited to: the value associated with a pixel's luminance, hue, saturation, gloss, or depth; the value of the opacity, luminosity or other characteristic of an alpha channel at the pixel's position; and the value of the opacity, luminosity or other characteristic of a previously defined mask at the pixel's position.

In some embodiments, a user may direct an application to mask all pixels in an image that satisfy a more complex condition or function or that are related in a more complex way to a user-selected pixel. In other embodiments, a user may direct an application to mask pixels in an image that satisfy a more complex condition or function or that are related in a more complex way to a user-selected pixel only when the set of all masked pixels forms a single contiguous area around the user-selected pixel.

In one example, an application may choose to include pixels in a mask or selection by first identifying patterns of values of a parameter like depth distance, hue, or color, and then correlating patterns of the values of one or more such parameters to identify and isolate a three-dimensional object represented by an area of the image. Such objects might comprise, but are not limited to, a subject's face, an article of clothing, or a person standing in front of a building.

In another embodiment, an image-editing application may extend the methods described herein to two or more images simultaneously. Such an extension might allow the application to identify objects that are common to the two or more images in order to more accurately stitch the two or more images into a single panoramic image. The information provided by the depth map may also be used to make other adjustments to the two or more images that might facilitate seamless stitching, such as adjusting the perspective of each image such that selected areas that represent objects common to multiple images assume a consistent size and shape.

In some embodiments, an image-editing application may perform steps of the method of the present invention by using one or more depth maps that are created by one or more external mechanisms and imported into the application. Such external devices may comprise, but are not limited to, digital still cameras, digital videocameras, other types of digital-imaging devices, and software applications.

In other embodiments, the method of the present invention may be extended to video-editing applications, wherein the techniques described above may be performed upon each frame of a video clip and wherein the results of these steps identify relationships between pixel subsets or areas of different frames. Applications of such embodiments might perform functions that comprise, but are not limited to, colorizing a black-and-white movie or changing the contrast of an object as it moves around the frame.

Colorization, for example, may be performed by adjusting the hue, saturation, color, or other parameter of one or more pixels of an automatically chosen selection or masked area of one or more frames of the sequence of video frames, wherein each colorized frame's selection or masked area is chosen as a function of a set of received depth values associated with that colorized frame. Here, methods of the present invention may be used to identify and isolate three-dimensional objects that are common to multiple frames in a sequence of video frames. Such colorization may be used in applications that comprise, but are not limited to, converting black-and-white footage to color, changing the color of a three-dimensional object moving on the screen, or enhancing the mood of a scene by adjusting the apparent lighting of the scene.

These examples and FIGS. 1-2 describe embodiments of the present invention for purposes of illustration, but many modifications and changes should be apparent to those skilled in the art. Steps of the methods described herein may be performed in different order or may vary in minor ways. Accordingly, the appended claims are intended to encompass all such modifications and changes as fall within the true spirit and scope of this invention.

What is claimed is:

1. An image-processing workstation, comprising a computer processor, a memory coupled to the processor, and a computer-readable hardware storage device coupled to the processor, the storage device containing an image-processing application configured to be run by the processor via the memory to implement a method for using imported depth information to mask or select areas of a first digital image comprising a first set of pixels that are each associated with a corresponding set of graphical properties, the method comprising:

the image-processing workstation receiving the first digital image, wherein a depth map is embedded into the first digital image as metadata, wherein the depth map comprises a first set of depth values, and wherein a first pixel of the first set of pixels is further associated with a first depth value of the first set of depth values;

the image-processing workstation accepting a command to identify a first subset of the first set of pixels;

the image-processing workstation, in response to the command, identifying a boundary of the first subset, wherein the boundary comprises a second subset of the first set of pixels, and wherein the identifying the second subset is performed as a function of the depth map.

2. The workstation of claim 1, wherein the identifying is a two-step process in which the image-processing workstation first roughly identifies an estimated boundary as a function of the depth map, wherein the estimated boundary comprises a third subset of the first set of pixels, and then selects each pixel of the second subset from the third subset as a function of a first value associated with the selected pixel, wherein the first value associates the selected pixel with a corresponding value of a first property of the set of graphical properties.

3. The workstation of claim 1, further comprising:
the image-processing workstation receiving a second set of depth values associated with a second digital image, wherein the second digital image comprises a second set of pixels, and wherein a second depth value of the second set of depth values is associated with a second pixel of the second set of pixels;

the image-processing workstation accepting a command to select a second subset of the second set of pixels;

the image-processing workstation, in response to the command, selecting the first pixel as a function of the first depth value and selecting the second pixel as a function of the second depth value;

the image-processing workstation stitching the first digital image and the second digital image into a panoramic image, wherein said stitching is a function of a first graphical property of the first pixel and of a second graphical property of the second pixel.

4. The workstation of claim 3, wherein the first pixel is associated with a first value of a secondary parameter, wherein the selecting the first pixel is a further function of the first value of a secondary parameter, and wherein the secondary parameter is selected from a group comprising:

pixel luminance, pixel hue, pixel saturation, or pixel gloss;

opacity, luminosity, or an other characteristic of an alpha channel at a pixel position; and opacity, luminosity, or another characteristic of a previously defined mask at a pixel position.

5. The workstation of claim 4, wherein the selecting is a further function of a pattern formed by a set of values of the secondary parameter, wherein a value of the set of values is associated with a corresponding pixel of the first set of pixels.

6. The workstation of claim 1, wherein the first digital image is a digital-video frame of a sequence of digital-video frames, and wherein the receiving, accepting, and identifying are repeated for each frame of the sequence.

7. The workstation of claim 6, wherein the image-processing workstation colorizes the first digital image, wherein the colorization comprises adjusting the color, saturation, or hue of the first pixel, and wherein the adjusting is a function of the first depth value.

8. A method of using imported depth information to mask or select areas of a first digital image comprising a first set of pixels that are each associated with a corresponding set of graphical properties, the method comprising:

an image-processing workstation, comprising a computer system and an image-editing application, receiving the first digital image, wherein a depth map is embedded into the first digital image as metadata, wherein the depth map comprises a first set of depth values, and wherein a first pixel of the first set of pixels is further associated with a first depth value of the first set of depth values;

the image-processing workstation accepting a command to identify a first subset of the first set of pixels;

the image-processing workstation, in response to the command, identifying a boundary of the first subset, wherein the boundary comprises a second subset of the first set of pixels, and wherein the identifying the second subset is performed as a function of the depth map.

9. The method of claim 8, wherein the identifying is a two-step process in which the image-processing workstation first roughly identifies an estimated boundary as a function of the depth map, wherein the estimated boundary comprises a third subset of the first set of pixels, and then selects each pixel of the second subset from the third subset as a function of a first value associated with the selected pixel, wherein the first value associates the selected pixel with a corresponding value of a first property of the set of graphical properties.

10. The method of claim 8, wherein the method further comprises:

the image-processing workstation receiving a second set of depth values associated with a second digital image, wherein the second digital image comprises a second set of pixels, and wherein a second depth value of the second set of depth values is associated with a second pixel of the second set of pixels;

the image-processing workstation accepting a command to select a second subset of the second set of pixels;

the image-processing workstation, in response to the command, selecting the first pixel as a function of the first depth value and selecting the second pixel as a function of the second depth value;

the image-processing workstation stitching the first digital image and the second digital image into a panoramic image, wherein said stitching is a function of a first graphical property of the first pixel and of a second graphical property of the second pixel.

11. The method of claim 10, wherein the first pixel is associated with a first value of a secondary parameter, wherein the selecting the first pixel is a further function of the first value of a secondary parameter, and wherein the secondary parameter is selected from a group comprising:

pixel luminance, pixel hue, pixel saturation, or pixel gloss;

opacity, luminosity, or another characteristic of an alpha channel at a pixel position; and opacity, luminosity, or another characteristic of a previously defined mask at a pixel position.

12. The method of claim 11, wherein the selecting is a further function of a pattern formed by a set of values of the secondary parameter, wherein a value of the set of values is associated with a corresponding pixel of the first set of pixels.

13. The method of claim 8, wherein the first digital image is a digital-video frame of a sequence of digital-video frames, and wherein the receiving, accepting, and identifying are repeated for each frame of the sequence.

14. The method of claim 13, wherein the image-processing workstation colorizes the first digital image, wherein the colorization comprises adjusting the color, saturation, or hue of the first pixel, and wherein the adjusting is a function of the first depth value.

15. The method of claim 8, further comprising providing at least one support service for at least one of creating, integrating, hosting, maintaining, and deploying computer-readable program code in the computer system, wherein the computer-readable program code in combination with the computer system is configured to implement the receiving, accepting, and identifying.

16. A computer program product, comprising a computer-readable hardware storage device having a computer-readable program code stored therein, said program code configured to be executed by a processor of a computer system to implement a method for using imported depth information to mask or select areas of a first digital image comprising a first set of pixels that are each associated with a corresponding set of graphical properties, the method comprising:

an image-processing workstation, comprising the computer system and an image-editing application, receiving the first digital image, wherein a depth map is embedded into the first digital image as metadata, wherein the depth map comprises a first set of depth values, and wherein a first pixel of the first set of pixels is further associated with a first depth value of the first set of depth values;

the image-processing workstation accepting a command to identify a first subset of the first set of pixels;

the image-processing workstation, in response to the command, identifying a boundary of the first subset, wherein the boundary comprises a second subset of the first set of pixels, and wherein the identifying the second subset is performed as a function of the depth map.

17. The computer program product of claim 16, wherein the identifying is a two-step process in which the image-processing workstation first roughly identifies an estimated boundary as a function of the depth map, wherein the estimated boundary comprises a third subset of the first set of pixels, and then selects each pixel of the second subset from the third subset as a function of a first value associated with the selected pixel, wherein the first value associates the selected pixel with a corresponding value of a first property of the set of graphical properties.

18. The computer program product of claim 16, further comprising:

the image-processing workstation receiving a second set of depth values associated with a second digital image, wherein the second digital image comprises a second set of pixels, and wherein a second depth value of the second set of depth values is associated with a second pixel of the second set of pixels;

the image-processing workstation accepting a command to select a second subset of the second set of pixels;

the image-processing workstation, in response to the command, selecting the first pixel as a function of the first depth value and selecting the second pixel as a function of the second depth value;

the image-processing workstation stitching the first digital image and the second digital image into a panoramic image, wherein said stitching is a function of a first graphical property of the first pixel and of a second graphical property of the second pixel.

19. The computer program product of claim 18, wherein the first pixel is associated with a first value of a secondary parameter, wherein the selecting the first pixel is a further function of the first value of a secondary parameter, and wherein the secondary parameter is selected from a group comprising:

pixel luminance, pixel hue, pixel saturation, or pixel gloss;

opacity, luminosity, or another characteristic of an alpha channel at a pixel position; and opacity, luminosity, or another characteristic of a previously defined mask at a pixel position.

20. The computer program product of claim 19, wherein the selecting is a further function of a pattern formed by a set of values of the secondary parameter, wherein a value of the set of values is associated with a corresponding pixel of the first set of pixels.

* * * * *